United States Patent [19]

Levinson

[11] 4,184,984
[45] Jan. 22, 1980

[54] HIGH BREAKDOWN VOLTAGE VARISTOR

[75] Inventor: Lionel M. Levinson, Schenectady, N.Y.

[73] Assignee: General Electric Company, Schenectady, N.Y.

[21] Appl. No.: 842,600

[22] Filed: Oct. 17, 1977

Related U.S. Application Data

[63] Continuation of Ser. No. 721,052, Sep. 7, 1976, abandoned.

[51] Int. Cl.$^2$ .............................................. H01B 1/08
[52] U.S. Cl. .................................... 252/518; 252/519; 252/520; 252/521
[58] Field of Search ............................... 252/518–521

[56] References Cited

U.S. PATENT DOCUMENTS

| | | | |
|---|---|---|---|
| 3,764,566 | 10/1973 | Matsuoka et al. | 252/518 |
| 3,962,144 | 6/1976 | Matsuura et al. | 252/518 |
| 4,003,855 | 1/1977 | Wong | 252/519 |

Primary Examiner—Benjamin R. Padgett
Assistant Examiner—E. Suzanne Parr
Attorney, Agent, or Firm—Lawrence D. Cutter; Joseph T. Cohen; Marvin Snyder

[57] ABSTRACT

A metal oxide varistor with high breakdown electric field values, in excess of 1200 v.mm$^{-1}$, is processed by sintering a mixture which comprises zinc oxide with significant amounts of bismuth oxide, from approximately 10 mol percent to approximately 25 mol percent silicon dioxide and other beneficial metal oxide additives at temperatures between 800° C. and 1100° C.

10 Claims, 1 Drawing Figure

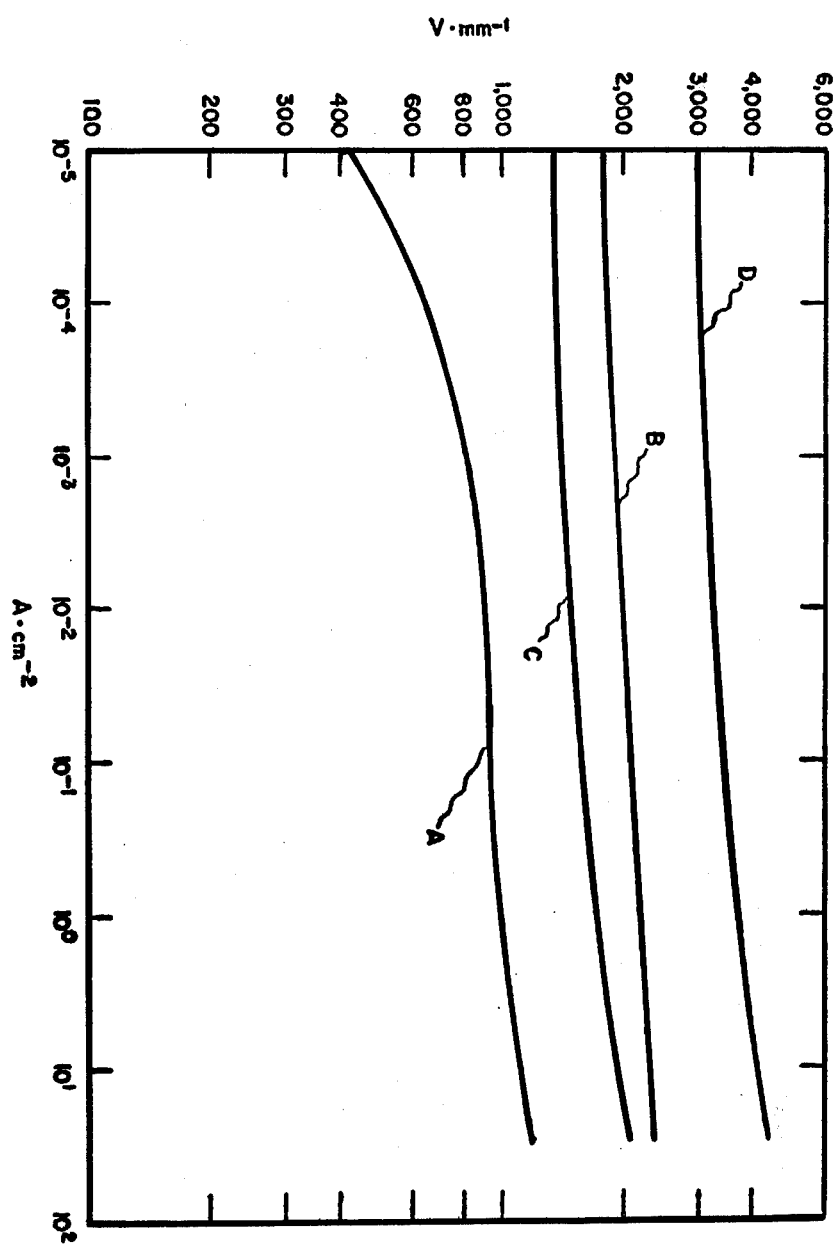

HIGH BREAKDOWN VOLTAGE VARISTOR

This is a continuation of application Ser. No. 721,052 filed Sept. 7, 1976, now abandoned.

BACKGROUND OF THE INVENTION

This invention relates generally to metal oxide, nonlinear voltage variable resistors. More particularly, the invention relates to metal oxide varistors having breakdown electric fields greater than 1200 volts per millimeter at 1 milliampere per square centimeter current density.

There are a few known materials which exhibit nonlinear resistance characteristics and which require resort to the following equation to quantitatively relate voltage and current:

$$I = (V/C)^\alpha$$

where V is the voltage between two points separated by a body of the material under consideration, I is the current flowing between points, C is a constant, and $\alpha$ is an exponent greater than 1. Both C and $\alpha$ are functions of the composition and process parameters utilized in the formation of the material. Materials such as silicon carbide exhibit nonlinear exponential resistance characteristics and are utilized as commercial varistors, however, such nonmetallic varistors generally exhibit an $\alpha$ exponent of no more than 6 and are, therefore, unsuitable for many voltage regulation and transient suppression applications.

A new family of varistor materials having $\alpha$ exponents in excess of 10 within the current density range of $10^{-3}$ to $10^2$ amp·cm$^{-2}$ have recently been produced by sintering a mixture containing a major portion of zinc oxide with bismuth oxide and other metal oxides and/or halides. Silicon dioxide has, occasionally, been utilized as an additive, in concentrations of 20 mol percent or less, in the aforementioned zinc oxide-bismuth oxide based varistor materials. However, these compositions exhibited relatively low breakdown fields and $\alpha$ exponents less than 6, which are not generally considered to be useful for high voltage regulation applications. U.S. Pat. No. 3,764,566 to Matsuoka et al and U.S. Pat. No. 3,928,245 to Fishman et al describe metal oxide varistors which comprise zinc oxide, bismuth oxide, and silicon dioxide. A comprehensive list of patents and technical publications which describe methods, formulas, and additives useful in the production of zinc oxide based varistors is included in the aforementioned Fishman et al patent. Those patents and technical publications are incorporated herein, by reference, as background material.

The breakdown field of a varistor material may be defined as the electric field which must be applied to a body of the material in order to produce a current density of $10^{-3}$ amp·cm$^{-2}$ in the material. Prior art metal oxide varistor materials generally exhibit breakdown fields between approximately 30 volts per millimeter and approximately 1200 volts per millimeter.

It is desirable, however, to produce varistor components having breakdown fields in excess of 1200 volts per millimeter with exponents in excess of 10.

SUMMARY OF THE INVENTION

Metal oxide varistor compositions are produced by sintering a mixture which comprises a major portion of zinc oxide with significant amounts of bismuth oxide, other commonly used additives, for example, the oxides and/or fluorides of cobalt, manganese, antimony, chromium, nickel, magnesium, boron, barium, zirconium, molybdenum, strontium, lead, and/or tin, and additionally, from approximately 10 mol percent silicon dioxide to approximately 25 mol percent silicon dioxide at temperatures between 800° C. and 1100° C. Metal oxide varistors produced from the aforementioned composition exhibit breakdown fields of 4000 v·mm$^{-1}$ or more and $\alpha$ exponents as high as approximately 50.

It is, therefore, an object of this invention to provide compositions and processes for producing metal oxide varistor materials having breakdown fields in excess of 1200 volts per millimeter and $\alpha$ exponents in excess of 10.

Another object of this invention is to provide additives for increasing the breakdown voltage of metal oxide varistor compositions.

BRIEF DESCRIPTION OF THE DRAWING

The novel features believed characteristic of the present invention are set forth in the appended claims. The invention itself, together with further objects and advantages thereof, may best be understood by reference to the following detailed description taken in connection with the appended drawing in which the single FIGURE is a family of voltage-current characteristic curves of metal oxide varistors produced in accordance with the present invention.

DESCRIPTION OF THE PREFERRED EMBODIMENTS

Prior art metal oxide varistor compositions comprise sintered mixtures of zinc oxide, bismuth oxide, and other metal oxides which are described in the above-referenced patents and technical publications. Silicon dioxide, in concentrations of up to 20 mol percent, has been utilized as an additive in those prior art varistor compositions and the breakdown field of varistors produced therefrom have been found to increase with silicon dioxide concentration. I have determined, however, that the breakdown field of zinc oxide-bismuth oxide based metal oxide varistors increases in a drastic and unexpected manner when varistor precursor mixtures which comprise zinc oxide, bismuth oxide, and from approximately 10 mol percent to approximately 25 mol percent silicon dioxide are sintered at relatively low temperatures: That is, between approximately 1100° C. and approximately 800° C.

Varistors of the present invention are produced by sintering a mixture comprising from approximately 10 mol percent to approximately 90 mol percent zinc oxide (ZnO), at least approximately 0.1 mol percent bismuth oxide (Bi$_2$O$_3$), from approximately 10 mol percent to approximately 25 mol percent silicon dioxide (SiO$_2$) and from 0.1 to 10 mol percent of one or more of the following metal oxide additives: cobalt oxide, manganese oxide, antimony oxide, chromium oxide, nickel oxide, magnesium oxide, boron oxide, barium oxide, zirconium oxide, molybdenum oxide, strontium oxide, lead oxide, and/or tin oxide. In addition, it may be advantageous to include the fluorides of bismuth, cobalt, manganese, antimony, chromium, nickel, magnesium, boron, barium, zirconium, molybdenum, strontium, lead, and/or tin in concentrations from approximately 0.1 mol percent to approximately 10 mol percent as additives in accordance with the teachings of the prior art.

The breakdown field of varistors produced in accordance with the present invention increases as an inverse function of the length of the sintering period and/or of the sintering temperature. Mixtures of metal oxide powders are prepared in accordance with the methods described in the above-referenced patents and are sintered at temperatures in the range between approximately 800° C. and 1100° C. for times between approximately one-quarter hour and approximately two hours. Optimum values of breakdown field and α exponent are achieved from mixtures which comprise from approximately 10 mol percent silicon dioxide to approximately 20 mol percent silicon dioxide and which are fired in the temperature range between 900° C. and 1050° C.

The high breakdown field and α exponent values which are characteristic of the varistors of the present invention are achieved through the combined effects of silicon dioxide additive control and low firing temperature. Mixtures which do not contain silicon dioxide in the specified concentrations do not appear to exhibit the sharp rise in breakdown field, with decreasing sintering temperature, which is characteristic of my high field varistors.

EXAMPLES OF HIGH BREAKDOWN FIELD VARISTORS

Varistors were produced by sintering a mixture: 0.425 mol percent each of $Bi_2O_3$, $Co_2O_3$, $MnO_2$, $Cr_2O_3$; 0.85 mol percent each of $Sb_2O_3$ and NiO; with the indicated percentages of $Si_2O_3$; and ZnO to make 100 percent. The mixtures were prepared using standard, prior art, ceramic practice and were sintered for one and one-half hours at the indicated temperatures.

The single FIGURE represents the voltage-current characteristics of varistors produced by the above described process.

Curve A is characteristic of a mixture, comprising 16.5 mol percent $SiO_2$, sintered at 1175° C. The charateristics of this device may be predicted from the prior art. The breakdown field is approximately 950 v·mm$^{-1}$.

Curve B is characteristic of varistors, comprising 15 mol percent silicon dioxide, fired at 1000° C. This composition exhibits an α exponent of 51 at $10^{-3}$ amp·cm$^{-2}$ and a breakdown field of approximately $2 \times 10^3$ v·mm$^{-1}$.

Curve C is characteristic of a varistor comprising 17½ mol percent silicon dioxide, sintered at 1090° C. This varistor is characterized by an α exponent of 90 at $10^{-3}$ amp·cm$^{-2}$ and a breakdown field of approximately $1.3 \times 10^3$ v·mm$^{-1}$.

Curve D is characteristic of a varistor which comprises 20 mol percent silicon dioxide, sintered at 1000° C. This composition is characterized by an α exponent of 52 at $10^{-3}$ amp·cm$^{-2}$ and a breakdown field in excess of $3 \times 10^3$ v·mm$^{-1}$.

The highest value of breakdown field achieved in varistors of the present invention was characteristic of a varistor produced from a mixture comprising 15 mol percent silicon dioxide sintered at 950° C. This varistor demonstrated a breakdown field greater than $4 \times 10^3$ v·mm$^{-1}$ and an α exponent greater than 10.

EXAMPLES OF HIGH BREAKDOWN FIELD VARISTORS COMPRISING LARGE CONCENTRATIONS OF SILICON DIOXIDE

A varistor comprising 25 mol percent silicon dioxide was sintered at 1094° C. The varistor sustained an electric field of approximately 5 kilovolts per millimeter at a current density of approximately 1 amp·cm$^2$. These devices exhibit the properties of high breakdown field varistors but are characterized by a relative low α exponent, approximately 8 in the current range from 0.35 amp·cm$^2$ to 1.75 amp·cm$^2$. Similar varistors which comprise approximately 15 mol percent silicon dioxide exhibit an α exponent greater than 20 in this current range.

Metal oxide ceramics which comprise approximately 30 mol percent silicon dioxide did not exhibit varistor properties.

Metal oxide varistor ceramics which are produced from mixtures comprising from approximately 10 mol percent to approximately 25 mol percent silicon dioxide exhibit breakdown field values of approximately 1000 volts per millimeter or above and are, therefore, useful in the production of high voltage varistor components.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A metal oxide varistor exhibiting a breakdown voltage in excess of 1,200 v·mm$^{-1}$ at a current density of $10^{-3}$ amp·cm$^{-2}$ comprising the reaction product formed by sintering a mixture including a major portion of zinc oxide (ZnO) with bismuth trioxide ($Bi_2O_3$), and between approximately 10 mol percent and approximately 25 mol percent silicon dioxide ($SiO_2$) at temperatures between approximately 1100° C. and 800° C.

2. The varistor of claim 1 exhibiting an α exponent in excess of 10 at a current density of $10^{-3}$ amp·cm$^{-2}$.

3. The varistor of claim 2 wherein said mixture further includes materials selected from the group consisting of the oxides and fluorides of cobalt, manganese, antimony, chromium, nickel, magnesium, boron, barium, zirconium, molybdenum, strontium, lead, and tin.

4. The varistor of claim 2 wherein said mixture is sintered for periods between approximately one-quarter hour and approximately two hours.

5. The varistor of claim 3 wherein said mixture comprises 15 mol percent silicon dioxide.

6. The varistor of claim 5 wherein said mixture is sintered at 940° C.

7. The varistor of claim 3 wherein said mixture comprises 17½ mol percent silicon dioxide.

8. The varistor of claim 3 wherein said mixture comprises 20 mol percent silicon dioxide.

9. The varistor of claim 3 wherein said mixture comprises between 10 mol percent $SiO_2$ and 20 mol percent $SiO_2$ and is sintered at temperatures between 1050° C. and 900° C.

10. The varistor of claim 3 comprising 0.425 mol percent each of bismuth trioxide, cobalt trioxide, manganese dioxide, and chromium trioxide; and 0.85 mol percent each antimony trioxide and nickel oxide.

* * * * *